July 22, 1969     G. L. HERVERT     3,456,635
MEANS FOR PREVENTING HYDROCARBON LOSSES FROM AN ENGINE
CARBURETOR SYSTEM
Original Filed May 3, 1965

INVENTOR:
George L. Hervert
BY: James R. Hoatson Jr.
Philip T. Liggett
ATTORNEYS

United States Patent Office 3,456,635
Patented July 22, 1969

3,456,635
MEANS FOR PREVENTING HYDROCARBON LOSSES FROM AN ENGINE CARBURETOR SYSTEM
George L. Hervert, Downers Grove, Ill., assignor to Universal Oil Products Company, Des Plaines, Ill., a corporation of Delaware
Original application May 3, 1965, Ser. No. 452,663, now Patent No. 3,368,326, dated Feb. 27, 1968. Divided and this application Aug. 30, 1967, Ser. No. 664,341
Int. Cl. F02m 7/12, 17/18; F02b 77/00
U.S. Cl. 123—136                                              4 Claims

ABSTRACT OF THE DISCLOSURE

A hydrocarbon vapor absorption-desorption device, for use with an internally vented engine carburetor, comprising a permeable bed or section of hydrocarbon absorbent material such as activated charcoal or molecular sieves. The absorbent is positioned within the carburetor unit downstream from the air cleaner structure and upstream from the discharge end of the vent. The absorbent traps gasoline vapors at low speed operation or for engine shut-off and is desorbed by inflowing air at high speed engine operation.

---

Figure 1:
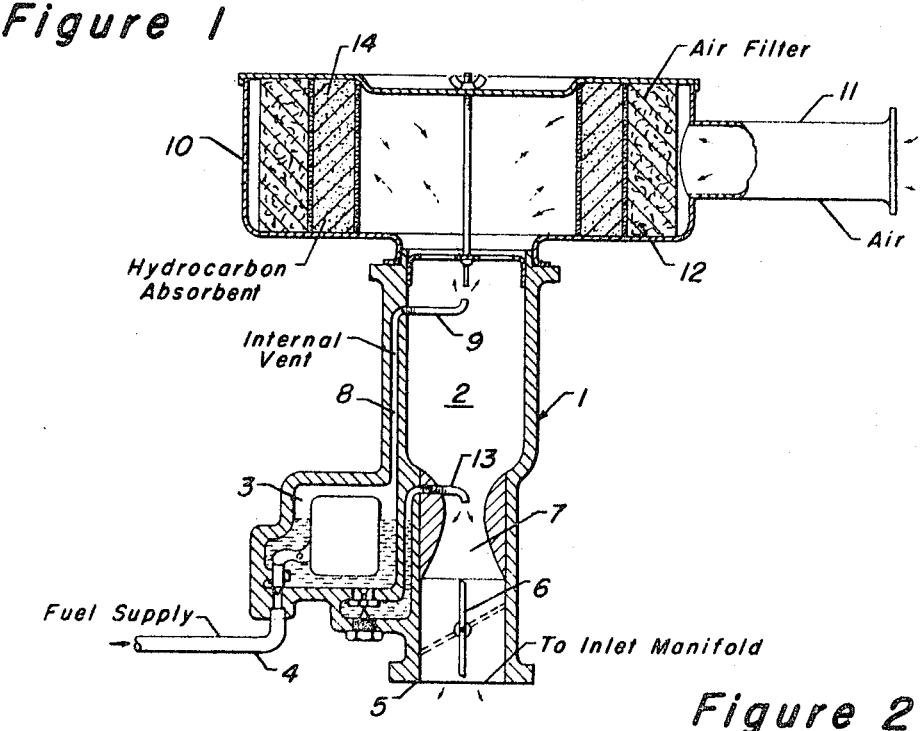

This application is a division of my copending application Ser. No. 452,663, filed May 3, 1965, now U.S. Patent No. 3,368,326 issued Feb. 27, 1968.

The present invention is directed to apparatus for preventing hydrocarbon losses from an engine carburetor system and more specifically, to the use of a hydrocarbon absorbent material maintained in communication with a vent from the carburetor to provide for the collection of gasoline vapors and the subsequent desorption thereof back into the system in order to reduce air pollution.

In addition to the well recognized air pollution problem from auto engine exhaust gases and from crankcase vapors, it is known that vapors from gasoline tanks and from carburetors contribute substantially to the atmosphere contamination. Actually, it is believed that carburetor and fuel tank evaporation losses may amount to some 20% or more of the total hydrocarbons emitted from cars into the Los Angeles area.

In order to obtain the proper gasoline flow to a carburetor mixing section from the float bowl, there must be provided suitable vent means from the float bowl to maintain atmospheric pressure therein. In one instance, the prevention of a vapor pressure build-up in the float bowl unit is provided by a vent line from the bowl directly to the atmosphere, and such an arrangement is referred to as an "external vent system." There is also an "internal vent system" where there is a direct line or passageway from the inside of float bowl to the air intake portion of the carburetor and upstream of the venturi mixing section thereof.

As an additional aspect of fuel losses from a carburetor there is a condition that has been termed "hot-soak loss," which results from the evaporation losses of gasoline from the carburetor float bowl after an engine is stopped. Such loss may be quite appreciable during hot weather periods and after an engine is hot from an extended period of operation.

It is thus a principal objective of this invention to substantially eliminate air pollution caused by gasoline losses from carburetor bowl vents by providing a hydrocarbon absorption bed or "gasoline-sink" in combination with the carburetor system such that the bed will pick up vapors from the vent means during idle or slow engine speed operations, as well as from "hot soak losses," but will permit hydrocarbon release from the absorbent bed back into the carburetor during high engine speed operations.

It is a further objective of the invention to provide hydrocarbon absorbent means in combination with the carburetor system such that there may be absorption of vapors for both internal and external vent systems of carburetor design.

In connection with the use of a carburetor system having an internal vent from the float bowl, there may be utilized a bed of hydrocarbon absorbent material in combination with the air filtering portion of the system. Such an absorbent section shall be positioned down stream with respect to the air intake and air filtering unit to the carburetor, but is upstream from the mixing zone of the carburetor, whereby the hydrocarbon absorbent material is readily available for initially receiving gasoline vapors after the engine is stopped and perhaps during the engine idle period. At the same time absorbed vapors will be in a position to be released by the action of the incoming air stream through the filter after the automobile engine is started and again running.

In connection with a carburetor system utilizing an external vent from a float bowl, there may be utilized a separate chamber or housing to hold an absorbent bed for the hydrocarbon vapors being lost from such vent, as well as a secondary air intake and filter means in combination therewith. Thus, during periods of high engine operation, there can be a slip stream of air pulled through the secondary air-intake and the adjacent absorbent bed to permit the suction of the desorbed vapors into the carburetor mixing section along with the principal air stream and into the automobile engine. Suitable valve means are incorporated into the carburetor-absorption system such that the absorber section is operative to pick up vaporized hydrocarbons during idle and low engine speed operations as well as for the "hot-soak period" after an engine has been turned off; while conversely, during the high speed operation of the engine, there will be a reversing flow and a secondary intake to provide a desorption operation.

It is not intended to limit the hydrocarbon absorbent to any one type of absorbent material to be used within the air filter zone for an internal vent or in a separate chamber for connection to an external vent line. It is of course desired to absorb primarily the volatile $C_4$, $C_5$ and $C_6$ hydrocarbons which readily are lost from the carburetor float bowl. The absorbent should, however, possess a high selectivity for hydrocarbons in the presence of water vapor and will normally be in subdivided form capable of being retained a pervious contact bed or may be distributed within a suitable supporting medium, such as polyurethane foam. Suitable absorbent materials may comprise fuller's earth, silica gel, activated carbon, charcoal (especially that made from certain nut shells or peach pits), alumina, etc.

Reference to the accompanying drawing and the following description thereof will serve to better describe the present invention and also point out additional advantageous features in connection therewith.

FIGURE 1 of the drawing is a diagrammatic sectional view through a carburetor system incorporating an internal vent arrangement and a hydrocarbon absorbent bed in combination with the air intake filter.

Figure 2:
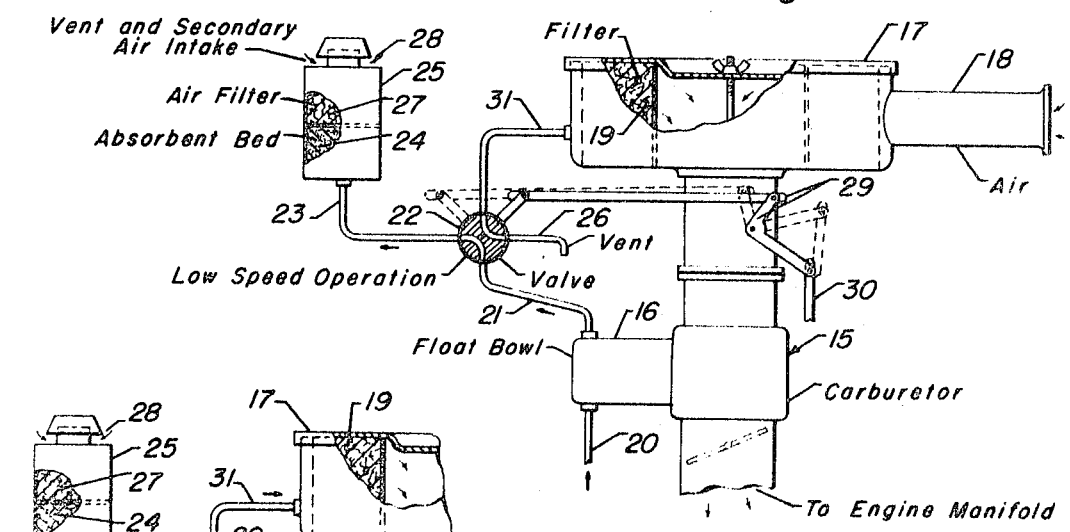

FIGURE 2 is a diagrammatic drawing showing a carburetor unit having an external vent and valving means for connecting the vent to a separate hydrocarbon absorbent bed or "gasoline sink" being combined with a secondary air intake means.

Figure 3:
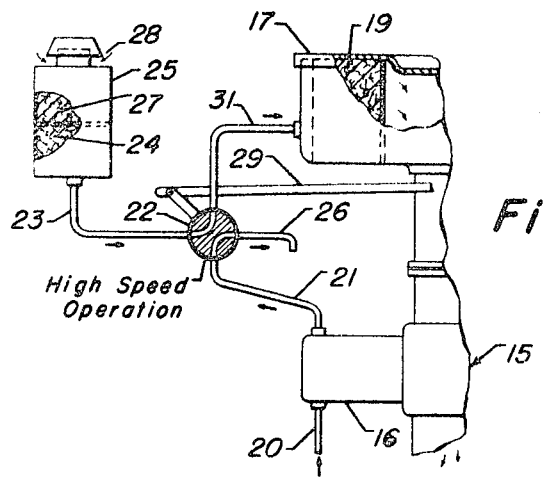

FIGURE 3 of the drawing shows a modified flow for the embodiment of FIGURE 2, with the valve arrangement being shown operative to effect desorption of hydrocarbon vapors back into the carburetor air intake at high engine speed operations.

Referring now particularly to FIGURE 1 of the drawing, there is shown diagrammatically a carburetor unit 1 having an inlet section 2 and a float bowl section 3, which is in turn being supplied with gasoline from fuel line 4. The carburetor 1 is, of course adapted to be mounted on or connected with an engine manifold at the outlet end 5. There is also shown a suitable throttle 6 and a venturi mixing section 7. An internal vent passageway 8 is provided from the float bowl section 3 to an upper outlet tube 9 which in turn discharges into the top air inlet end of the carburetor. Attached directly to the upper end of the carburetor, above section 2, there is provided an air filter housing 10 having an air intake opening 11 and an internal cylindrical form of filter unit 12. Thus, a means is provided for introducing air into the carburetor 1 and to the venturi section 7 where it is mixed with gasoline from the float bowl by way of nozzle 13 to in turn provide an air-fuel mixture to the engine.

In accordance with one embodiment, there is provided a hollow cylindrical form of hydrocarbon absorbent bed 14, in suitable pervious retaining means which is maintained upstream from the carburetor intake section 2, but downstream with respect to the air filter 12, such that all carburetor vapors which are released from the float bowl by way of vent 9 would pass into direct contact with the absorben material of bed 14. As previously set forth, such bed may comprise activated carbon, charcoal, or molecular sieves, etc., which will be particularly adapted to selectively adsorb the lower molecular weight hydrocarbon which will be evaporated from the carburetor float bowl and mixing zone.

Although the absorbent bed 14 is shown as a hollow cylindrical form positioned directly adjacent to the air filter element 12, it is to be noted that various other forms or configurations may well be embodied in the air filter casing or within a separate intermediate section between the air filter unit and the inlet end of the carburetor. For example, the hydorcarbon absorbent may be in a flat confined bed placed horizontally across the outlet portion of the air filter casing or, alternatively, it may be in a bed retained within a separate removable section connected intermediately between the lower end of the air filter casing and the top end of the carburetor. In any case, the "gasoline sink" or absorber bed will serve to collect hydrocarbon vapors during the "hot soak period" or at slow engine speed operations and, simultaneously, be in a position to release absorbed vapors into the main air stream as the engine speed is increased and as the mass flow of air to the carburetor in turn increases.

Referring now particularly to FIGURES 2 and 3 of the drawing, there is shown a carburetor unit 15 with a float bowl section 16 connected with an air filter housing 17, which in turn has an air intake opening 18 and an internal filter member 19. Although not shown in detail as in the case of FIGURE 1, the carburetor 15 is provided with an air inlet section, an internal mixing section, and means for attaching the fuel-air mixture outlet end of the carburetor to the engine manifold. Gasoline is supplied to the float bowl 16 of the carburetor by way of line 20.

In the present embodiment for accommodating an external vent, the line 21 from the upper end of the carburetor float bowl 16 is connected to a four way valve 22. The latter is in turn adapted to connect line 21 with a line 23 and to an absorbent bed 24 within a housing 25 and, alternately, to a vent line 26 which discharges to the atmosphere. The position of valve 22 in FIGURE 2 of the drawing indicates a "low engine speed operation" (which is inclusive of idle or a stopped engine position) with the vented vapors from the float bowl 16 passing by way of lines 21 and 23 directly into the absorbent bed 24. As noted hereinbefore, such an absorbent bed may comprise a bed of subdivided hydrocarbon absorbent material or a gas pervious form type of support which in turn contains suitable finely divided hydrocarbon absorbent. The upper part of the casing 25 is indicated as having an air filter mat 27 as well as a secondary air intake opening 28. In FIGURE 2 of the drawing, a linkage means 29 connects with the four way valve 22 such that it may be moved into alternative positions for accommodating both low speed and high speed engine operations. The attachement and movement of linkage 29 is made to move responsive to arm means 30 which is connective with a power jet lever to the carburetor. In general, all present day carburetor systems utilize a power jet nozzle which is operative from suitable accelerator linkage means on the carburetor such that at high engine speed operations there is an added gasoline flow into the carburetor from power jet nozzle means. In the instance of the low engine speed operation the four-way valve 22 provides a connection between vent line 26 and line 31 to the air filter casing 17 whereby there is actually no venting from the float bowl by way of line 21, but, in lieu, thereof, the direct connection to the "gasoline sink" provided by absorbent bed 24. On the other hand where there is a high speed operation, there will be the alternative positioning of the linkage means 29 and of four-way valve 22, as best shown in FIGURE 3 of the drawing, such that the hydrocarbon material in bed 24 will be desorbed by way of a slip stream of air entering 28 and then carried by way of lines 23 and 31 into the air filter casing 17 and then from the latter into the mixing zone of the carburetor. During this period of time, the four-way valve 22 does connect vent line 21 directly with vent line 26; however, for the high speed operations there will be little or no gasoline vapors from the float bowl 16 and the hydrocarbon losses to the atmosphere from line 26 will be minimal.

The diagramamtic indication of the gasoline sink unit or absorbent bed 24 in both FIGURES 2 and 3 of the drawing shall of course be considered as merely one embodiment and not in any way limiting as to design and positioning. In other words, various types of absorbent beds 24 may be utilized in combination with the carburetor system to provide the desired bed for absorbing vaporous hydrocarbons from the carburetor unit.

Also, various types of valving means and linkage means may be employed to provide further low speed and high speed operation arrangements, whereby "hot soak loss" and engine idling operations will permit hydrocarbon absorption and, conversely, high engine speed operations will permit desorption of hydrocarbons along with air flow into the carburetor mixing zone.

I claim as my invention:

1. In combination with an engine carburetor system having an air-fuel mixing section, a float bowl section, a fuel inlet means extending from said float bowl section to said mixing section, an air inlet means and internal air passageway means therefrom connected upstream from and in fluid flow relationship to said mixing section, and internal vent means extending from said float bowl section in continuous fluid communication with and discharging to a confined zone in said air passageway means upstream from said mixing section and downstream from said air inlet means, a hydrocarbon vapor absorption-desorption means therewith adapted to preclude vapor losses from said system, which comprises in combination, a permeable hydrocarbon absorbent material arranged and positioned to extend transversely all the way across said passageway means between the discharge end of said internal vent means and said air inlet means to preclude bypass of air and vapor flow around the absorbent material, whereby substantially all hydrocarbon vapors released from said internal vent means and from said mixing section pass into contact with and are absorbed by such material upon substantial cessation of air flow to said mixing section and the absorbed vapors are then gradually desorbed by resumed inlet air flow through said permeable material to said mixing section.

2. The carburetor system of claim 1 further characterized in that said permeable hydrocarbon absorbent material is maintained within a housing for the air inlet means and having removable cover means and such material is positioned downstream from said air inlet to said housing.

3. The carburetor system of claim 2 still further characterized in that said permeable hydrocarbon absorbent material is in the form of a flat bed extending across the passageway between said air inlet means and the internal vent means from the float bowl.

4. In combination with an engine carburetor system having an air-fuel mixing section, a float bowl section, a fuel inlet means extending from said float bowl section to said mixing section, an air inlet means including a casing containing a hollow cylindrical air filter connected upstream from and in fluid flow relationship to said mixing section, and internal vent means extending from said float bowl section in continuous fluid communication with and discharging to a confined zone upstream from said mixing section and downstream from said air filter means, a hydrocarbon vapor absorption-desorption means therewith adapted to preclude vapor losses from said system, which comprises in combination, a permeable bed of hydrocarbon absorbent particles disposed in the form of a hollow cylindrical core member positioned in said casing and concentrically within said air filter, said bed being arranged and positioned to extend transversely substantially all the way across the fluid flow path between the discharge end of said internal vent means and said air filter to preclude bypass of air and vapor flow around the bed, whereby substantially all hydrocarbon vapors released from said internal vent means and from said mixing section pass into contact with and are absorbed by said bed upon substantial cessation of air flow to said mixing section and the absorbed vapors are then gradually desorbed by resumed inlet air flow through said bed to said mixing section.

References Cited
UNITED STATES PATENTS

| | | | |
|---|---|---|---|
| 3,001,519 | 9/1961 | Dietrich et al. | 123—136 |
| 3,093,124 | 6/1963 | Wentworth | 123—136 |
| 3,221,724 | 12/1965 | Wentworth | 123—136 |
| 3,391,679 | 7/1968 | Williams et al. | 123—136 |

LAURENCE M. GOODRIDGE, Primary Examiner

U.S. Cl. X.R.

123—198